Oct. 31, 1967    B. A. COLPO    3,349,636
AUTOMATIC TRANSMISSION
Filed Oct. 22, 1965    2 Sheets-Sheet 1
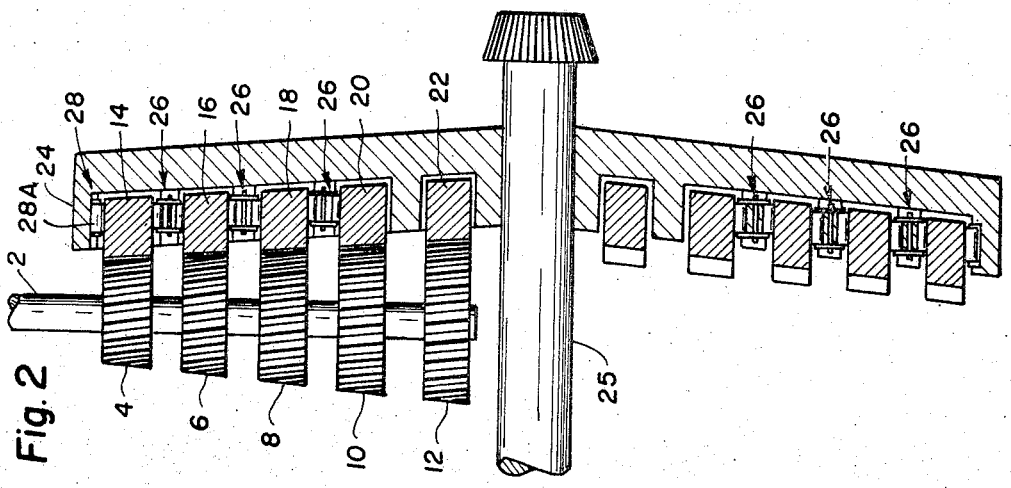
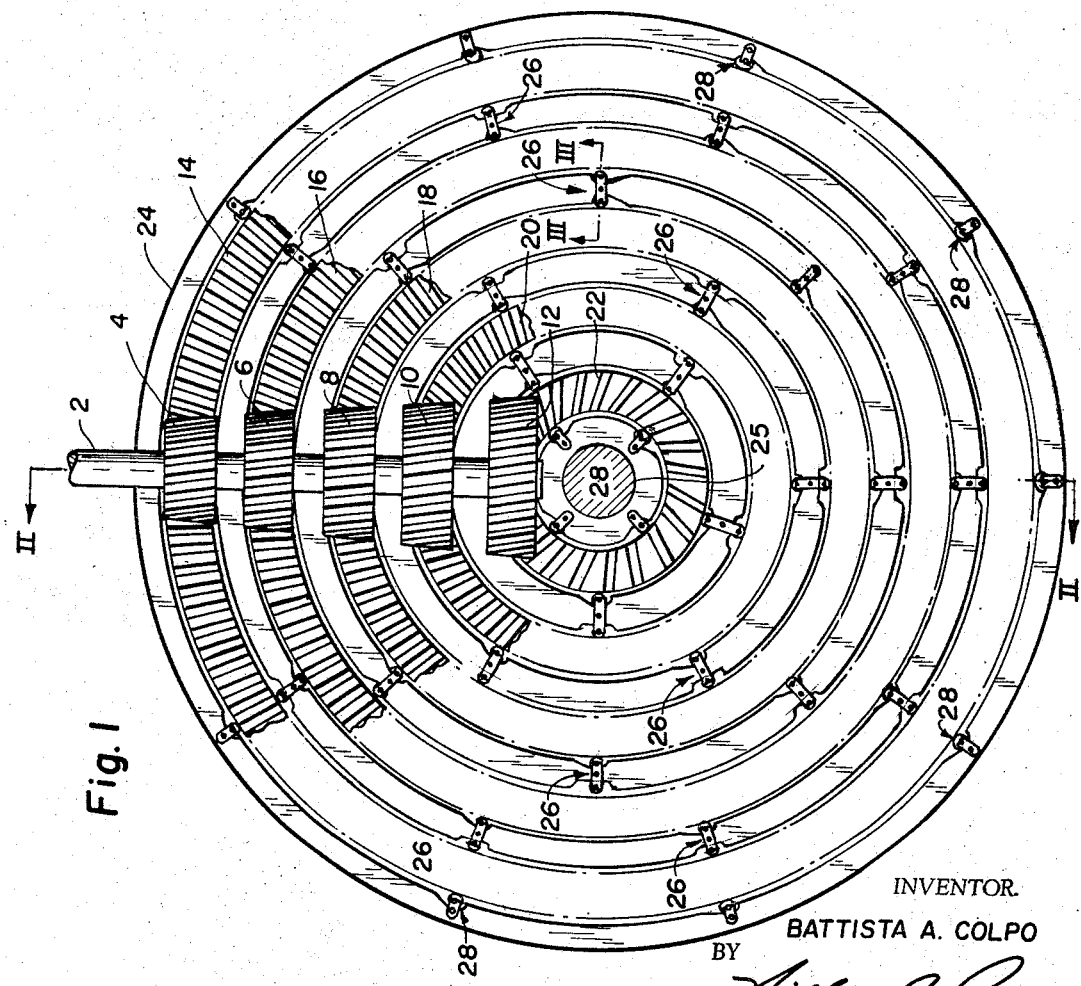
INVENTOR.
BATTISTA A. COLPO
BY
his ATTORNEY Oct. 31, 1967  B. A. COLPO  3,349,636
AUTOMATIC TRANSMISSION
Filed Oct. 22, 1965  2 Sheets-Sheet 2
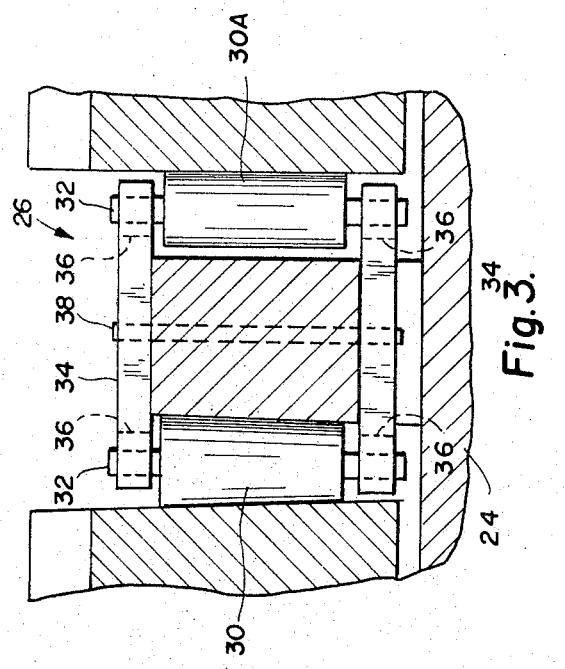
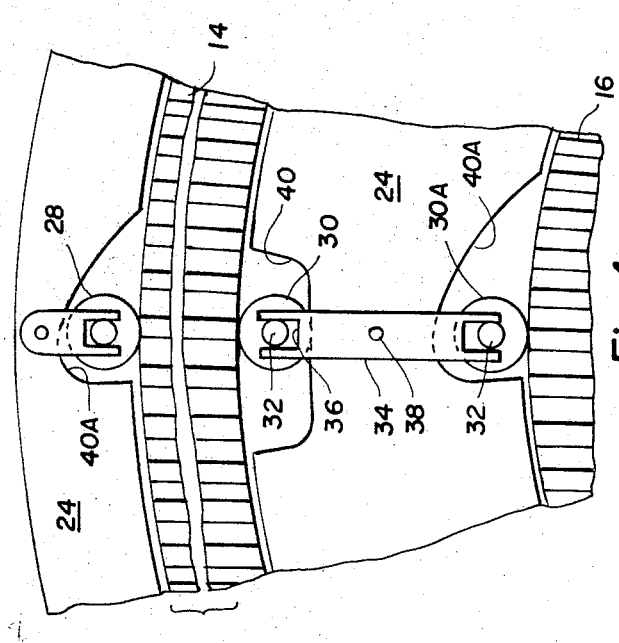
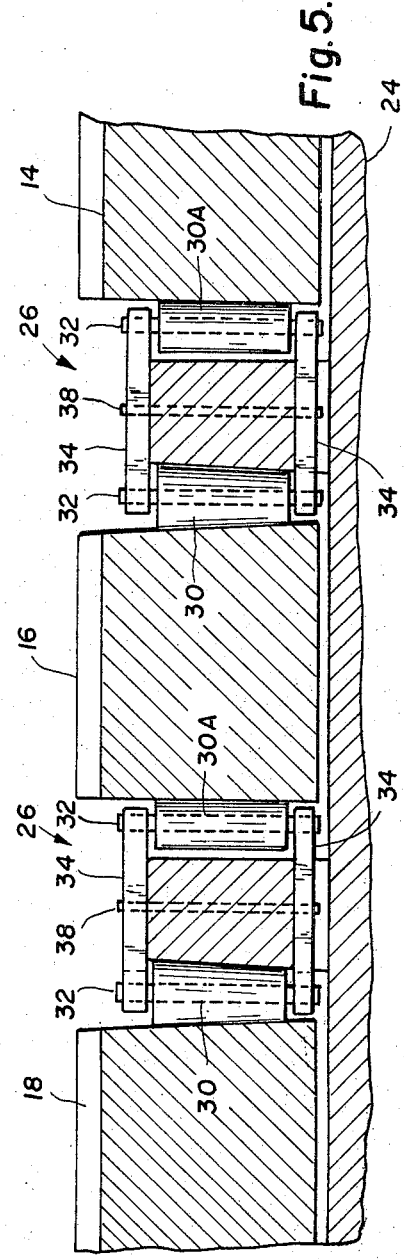
INVENTOR.
BATTISTA A. COLPO
BY
*William J. Ruano*
his ATTORNEY

United States Patent Office 3,349,636
Patented Oct. 31, 1967

3,349,636
AUTOMATIC TRANSMISSION
Battista A. Colpo, Harmar Drive, Cheswick, Pa. 15024
Filed Oct. 22, 1965, Ser. No. 502,040
4 Claims. (Cl. 74—368)

ABSTRACT OF THE DISCLOSURE

This invention relates to an automatic transmission device for vehicles, including a circular housing containing a series of ring gears of increasing diameters between which are provided a plurality of one-way clutches to selectively drive the vehicle at different speeds.

---

This invention relates to an automatic transmission device for vehicles, more particularly, automobiles.

An outstanding disadvantage of conventional automatic transmissions for vehicles is that they are extremely cumbersome in size and involve numerous parts, therefore, have relatively short life and require frequent maintenance, which is extremely costly to the owner.

An object of the present invention is to overcome the above-named disadvantages by providing an automatic transmission device of relatively small size, having very few and simple mechanical parts, therefore which is relatively inexpensive to manufacture, and which requires little maintenance and will have a life many fold as compared to that of the average automatic transmission presently used on vehicles.

Other objects and advantages will become more apparent from a study of the following description taken with the accompanying drawings wherein:

FIG. 1 is an elevational view, with a portion broken away, of an automatic transmission embodying the principles of the present invention;

FIG. 2 is a cross-sectional view taken along line II—II of FIG. 1;

FIG. 3 is an enlarged, cross-sectional view taken longitudinally of arm 34 of FIG. 4;

FIG. 4 is an enlarged, fragmentary view as viewed from the top of FIG. 3; and

FIG. 5 is an enlarged, fragmentary, cross-sectional view of a portion of FIG. 2.

Referring more particularly to FIGS. 1 and 2 of the drawing, numeral 2 generally denotes a drive shaft driven by the motor of a vehicle. Rigidly connected to drive shaft 2 are pinions 4, 6, 8, 10 and 12 which are of equal or progressively increasing diameters and which are preferably slightly outwardly tapered. These pinions are in gear meshing relationship with a plurality of ring gears 14, 16, 18, 20 and 22, respectively, which ring gears are mounted within well portions of circular outline formed in a housing 24. Housing 24 is rigidly secured to a driven shaft 25 which drives a gear at one end forming a part of the well known differential gear which drives two rear wheels of an automobile, in the well known manner.

Between ring gear 14 and housing 24 there are a plurality of circumferentially spaced, one-way clutch units 28 pivotally swingable in a wedge shaped groove 40A, as shown more clearly in FIG. 4. The arrangement is such that when ring gear 14 moves clockwise, as viewed in FIG. 4, the roller 28 will be frictionally dragged thereby and will wedge into the portion of groove 40A to the right, so that housing 24 will be driven by ring gear 14. When housing 24 is driven at greater speed and overruns ring gear 14, as when descending down hill, roller 28 will move to the left of groove 40A as shown and unclutch ring gear 14 from housing 24.

It will also be noted from FIGS. 3, 4 and 5 that there are a plurality of pivotal arms 34 having formed at the ends thereof saddle-like portions in which are mounted pins or trunnions 32 connected to roller bearings 30 and 30A which are adapted to slide on the adjoining surfaces of ring gears 14 and 16. When ring gear 14 is rotated clockwise, as viewed in FIG. 4, it will frictionally move roller bearings 30 to the right in groove 40 by turning about pin 38 as a pivot and at the same time moving roller bearing 30A to the left of the wedge shaped groove 40A, as illustrated in FIG. 4. Therefore, there will be no clutching by roller bearing 30A of housing 24 and ring gear 16.

As shown more clearly in FIG. 5, roller bearings 30 are preferably tapered so as to fit against tapered walls formed on the peripheries of the ring gears 14, 16, 18, 20 and 22. The mountings for pivots or pins 38 are integrally secured to housing 24.

Roller bearings 30 move to either end of an elongated raceway 40, depending on relative or different traveling speeds between housing 24 and ring gears.

In operation, when pinions 4, 6, 8, 10 and 12 start turning all the corresponding ring gears, roller bearings 30 will move to the right end of groove or raceway 40 so that all ring gears are turning freely and cannot clutch onto housing 24, except between ring gear 14 and housing 24 by the one way clutch bearing 28. Now housing 24 and ring gear 14, as one unit, start revolving, therefore driving the wheels of the vehicle to which they are coupled. The change of gear selection by roller bearing unit 26 can occur even with a steady throttle for a driven load tends to overrun the power source when in cruising range.

When speed is increased and the vehicle gains momentum, the forward motion of the driven load will cause housing 24 to overrun ring gear 14, which will release clutch bearings 28. At the same time, roller bearings 30 will move to the left of raceway 40, allowing roller bearings 30A to move into clutching position in the tapered raceway 40A between ring gears 16 and housing 24.

Now ring gear 16 and housing 24 are revolving as one unit. Ring gear 16 (being smaller in diameter than 14) will revolve housing 24 faster than ring gear 14, thus keeping clutch bearing 28 to the left end of groove 40A and disengaged.

In the third stage, the same action occurs as in second range. Ring gear 18 (being smaller in diameter than 16) and so on down to the fifth range.

The action described will go up or down the gear range, depending on load cruising speed or drifting.

Whatever speed or r.p.m. housing 24 is revolving, the ring gear that is turning just a little bit faster will clutch onto housing 24.

So it is the housing 24 trying to overrun ring gears and be free wheeling when the required power varies, such as descending, ascending or level travel. When power is increased, the ring gear that is near or a little over the r.p.m. of housing 24 will clutch onto housing 24 and keep it revolving.

When in high range (22 driven by 12) ring gear 22, being the smallest gear, will revolve housing 24 at a greater speed than the rest of the revolving ring gears and by this difference in speed, ball bearing 30 will move to the right end of groove 40 and clutch bearing 30A will be kept to the left of groove 40A for housing 24 is traveling too fast for clutch bearing 30A to engage in groove 40A.

The design of this gear and pinion system is free wheeling. Without clutch bearings 28, housing 24 will not start revolving. All gears will be turning freely by the working action of units 26.

Roller bearings 30 installed at a slight camber or angle between ring gear housing 24 and the inner side of ring gears will hold the same in alignment.

If, for example, ring gear 18 is the pulling or working gear, ring gears 16 and 14 cannot clutch because of being overrun by housing 24, and by the working action of units 26, 20 and 22, will not clutch ring gear 18. Riding on roller bearings 30, will move the same to the right of raceway 40 and, by lever action, will keep roller bearings 30A to the left end of grooves 40A between ring gears 18 and 20.

Referring to FIG. 4, with power source shut off and all gears stopped, housing 24 will revolve freely when the vehicle is towed or coasting down hill. Roller bearings 30 will roll under the ring gear and whatever position it will be in raceway 40, clutch bearing 30A will not clutch, because the tapered raceway 40A is also moving in the same direction.

From a standing start, the vehicle will not move if roller bearings 28 are removed. The ring gears will be revolving freely. To get the vehicle moving, it will have to be pushed or coasted down grade. Then the ring gears will take over and keep the vehicle moving.

Now if roller bearings 30 are removed between housing 24 and ring gear 14, bearing 30A is free to move into clutching position between ring gear 16 and housing 24 in tapered raceway 40A, so from a dead stop 24, will start revolving when power is applied.

By introduction or installation of electromagnetic coils at each unit 26 (not shown) the operator can select any gear ratio desired with push buttons or switches which complete a magnetic circuit to effect clutching.

Roller bearings 30 (between 24 and ring gears) accomplish two functions: (1) it is a regular bearing for ring gears to revolve on and be kept in position in each recessed area of housing 24; (2) by its free traveling in an elongated raceway 40 connected to arms 30, its main purpose is to keep roller bearing 30A (or clutch bearing) from engaging.

Thus it will be seen that I have provided an efficient automatic transmission for vehicles, which transmission is of compact construction and comprises comparatively few and simple mechanical parts, therefore requiring very little maintenance and providing very long life, as well as being exceedingly inexpensive to manufacture.

While I have illustrated and described a single specific embodiment of my invention, it will be understood that this is by way of illustration only, and that various changes and modifications may be made within the contemplation of my invention and within the scope of the following claims.

I claim:
1. An automatic transmission for vehicles comprising a drive shaft having a plurality of pinions rigidly secured thereto in longitudinally spaced relationship, a housing having well portions supporting a plurality of ring gears of different diameters, said pinions being of progressively increasing diameters in a direction radially inwardly of said housing, each of said ring gears being in meshing engagement with one of said pinions, a driven shaft rigidly connected to said housing and adapted to drive a differential gear, and a plurality of one-way clutches including roller bearings mounted on said housing and interposed between and in contact with said ring gears and in circumferentially spaced relationship, whereby said drive shaft may drive said housing selectively through one of said pinions and one of said meshing ring gears to drive said housing at different speeds.

2. An automatic transmission as recited in claim 1 wherein said housing is in the form of a shallow cup and wherein said one-way clutches are disposed on pivotal mountings supported rigidly with respect to said housing.

3. An automatic transmission as recited in claim 2 wherein circumferentially spaced, wedge shaped slots are provided within the inner surface of said well portions for receiving pivotally supported one-way clutches.

4. An automatic transmission as recited in claim 2 together with annular supports of various diameters mounted between said ring gears and rigidly secured to said housing, said supports having a plurality of circumferentially spaced grooves of substantially rectangular shape in one perimetrical surface and a plurality of circumferentially spaced grooves of substantially wedge shape in opposite perimetrical surfaces, and a plurality of levers each pivotally mounted between said grooves and provided with saddle-like ends, and roller bearings journaled in said saddle-like elements, whereby when said levers are tilted in one direction, the roller bearings in the wedge shaped slots will effect clutching between the adjoining ring gear and the support for said levers.

References Cited

UNITED STATES PATENTS

| 1,111,551 | 9/1914 | Adams | 74—368 X |
| 2,418,555 | 4/1947 | Kirsten | 74—417 X |
| 2,881,640 | 4/1959 | Chambers | 74—368 X |
| 3,067,626 | 12/1962 | Doerries et al. | 74—368 X |

DONLEY J. STOCKING, *Primary Examiner.*

L. H. GERIN, *Assistant Examiner.*